United States Patent
Sarh et al.

(10) Patent No.: US 8,301,302 B2
(45) Date of Patent: Oct. 30, 2012

(54) SYNCHRONOUS ROBOTIC OPERATION ON A STRUCTURE HAVING A CONFINED SPACE

(75) Inventors: Branko Sarh, Huntington Beach, CA (US); David H. Amirehteshami, Rossmoor, CA (US)

(73) Assignee: The Boeing Company, Chicago, IL (US)

( * ) Notice: Subject to any disclaimer, the term of this patent is extended or adjusted under 35 U.S.C. 154(b) by 1210 days.

(21) Appl. No.: 12/117,153

(22) Filed: May 8, 2008

(65) Prior Publication Data

US 2011/0245971 A1    Oct. 6, 2011

(51) Int. Cl.
G06F 19/00    (2011.01)

(52) U.S. Cl. ........ 700/245; 700/248; 700/264; 414/737; 29/33 R; 29/428; 29/524.1; 29/525.02; 29/525.06; 29/563; 29/650; 29/700; 29/900

(58) Field of Classification Search ................ 700/245, 700/248, 264; 414/73, 737; 29/26 A, 33 R, 29/407.09, 428, 524.1, 525.02, 525.06, 563, 29/650, 700, 900

See application file for complete search history.

(56) References Cited

U.S. PATENT DOCUMENTS

| | | | |
|---|---|---|---|
| 4,885,836 A * | 12/1989 | Bonomi et al. ............... | 29/524.1 |
| 4,995,148 A * | 2/1991 | Bonomi et al. ............... | 29/26 A |
| 5,191,639 A | 3/1993 | Hara | |
| 5,661,892 A | 9/1997 | Catania et al. | |
| 5,785,571 A * | 7/1998 | Camp ........................... | 446/124 |
| 6,014,802 A * | 1/2000 | Guerin ......................... | 29/407.01 |
| 6,108,896 A | 8/2000 | Gignac et al. | |
| 6,357,101 B1 | 3/2002 | Sarh et al. | |
| 6,536,100 B2 * | 3/2003 | Sarh et al. ....................... | 29/709 |
| 6,729,809 B2 * | 5/2004 | Sarh et al. ..................... | 408/1 R |
| 7,216,436 B2 * | 5/2007 | Whitworth et al. ............. | 33/286 |
| 7,507,059 B2 * | 3/2009 | Hamann ....................... | 409/132 |
| 7,682,112 B2 * | 3/2010 | Panczuk et al. ............... | 409/132 |
| 7,967,549 B2 * | 6/2011 | Geist et al. ................. | 414/744.5 |
| 8,051,547 B2 * | 11/2011 | Toh et al. ................... | 29/525.01 |

(Continued)

FOREIGN PATENT DOCUMENTS

EP    0338117 A2    10/1989

OTHER PUBLICATIONS

Rooks, Brian, Automatic wing box assembly developments, 2001, Industrial Robot: An International Journal vol. 28, No. 4, pp. 297±301.*

Roy et al., Design of a Reconfigurable Robot Arm for Assembly Operations inside an Aircraft Wing-Box, 2005, Proceedings of the 2005 IEEE International Conference on Robotics and Automation, pp. 590-595.*

(Continued)

*Primary Examiner* — Dalena Tran
*Assistant Examiner* — Jamie Figueroa (57) ABSTRACT

A fully automated method is performed on a structure having a confined space. The structure has a location that is identifiable from within the confined space and from outside the confined space. A first robotic system moves a first end effector inside the confined space such that the first end effector is positioned over the location. A first vector corresponding to the location is generated. A second robotic system moves a second end effector outside the confined space such that the second end effector is positioned over the location. A second vector corresponding to the location is generated. The first and second vectors are used to move the first and second end effectors to a new location such that the first and second end effectors are in working opposition. The first and second end effectors perform a synchronous operation at the new location.

20 Claims, 9 Drawing Sheets

U.S. PATENT DOCUMENTS

| | | | |
|---|---|---|---|
| 2002/0007548 A1* | 1/2002 | Stoewer et al. | 29/525.06 |
| 2004/0016097 A1* | 1/2004 | Bloch et al. | 29/407.1 |
| 2004/0117962 A1* | 6/2004 | Bloch et al. | 29/407.1 |
| 2008/0000070 A1* | 1/2008 | Hotz et al. | 29/431 |
| 2008/0028880 A1* | 2/2008 | Asada et al. | 74/469 |
| 2008/0155807 A1* | 7/2008 | Toh et al. | 29/525.01 |

OTHER PUBLICATIONS

Binayak Roy and H. Harry Asada, "An Underactuated Robot with a Hyper-articulated Deployable Arm Working inside an Aircraft Wing-Box" 2005 IEEE/RSJ International Conference on Intelligent Robots and Systems, ISBN 0-7803-8912-3 (Aug. 2005).

* cited by examiner

SYNCHRONOUS ROBOTIC OPERATION ON A STRUCTURE HAVING A CONFINED SPACE

BACKGROUND

During assembly of an aircraft, certain operations are performed synchronously on opposite sides of a structure. Consider a fastening operation on a wing box. A robotic system outside the wing box performs drilling, countersinking and fastener insertion tasks. A person inside the wing box supports these tasks, and also places a sleeve and nut over the inserted fastener while the robotic system is holding the fastener.

It would be desirable to eliminate the manual labor and fully automate such a fastening operation. Yet while placing a nut over the threads of a bolt might be a simple task for a human, it is not so simple for a robotic system. Precise positioning and orientation of a nut over a bolt is a complex task.

This task is even more complex because a robotic system would have to attach the nut in a confined space. The task is even more complex because the robotic system would have to enter the confined space via an access hole. The task is even more complex because aircraft tolerances are extremely tight. The task is even more complex because the robotic system inside the confined space has to synchronize its tasks with those of the robotic system outside the confined space.

SUMMARY

According to an embodiment herein, a fully automated method is performed on a structure having a confined space. The structure has a location that is identifiable from within the confined space and from outside the confined space. A first robotic system moves a first end effector inside the confined space such that the first end effector is positioned over the location. A first vector corresponding to the location is generated. A second robotic system moves a second end effector outside the confined space such that the second end effector is positioned over the location. A second vector corresponding to the location is generated. The first and second vectors are used to move the first and second end effectors to a new location such that the first and second end effectors are in working opposition. The first and second end effectors perform a synchronous operation at the new location.

According to another embodiment herein, a method of positioning an end effector within a confined space of a structure includes using a compliant robotic arm to move the end effector through an access port of the structure and into the confined space; using the robotic arm to coarsely position the end effector over a location of a surface within the confined space; using the robotic arm to press the end effector against the surface; and using a device attached to the end effector to shift the end effector along the surface to precisely position the end effector at the location.

According to another embodiment herein, a method is performed on a pre-assembled wing box of an aircraft. The pre-assembled wing box includes a plurality of fasteners. A first robotic system moves a first end effector inside the wing box over first and second temporary fasteners, and generates first vectors for the first and second fasteners. A second robotic system moves a second end effector outside the wing box over the first and second fasteners and generates second vectors for the first and second fasteners. The first and second vectors are used to compute permanent fastener locations between the first and second fasteners. The permanent fastener locations for the first robotic system are computed from the first vectors, and the permanent fastener locations for the second robotic system are computed from the second vectors.

DETAILED DESCRIPTION

Figure 1:
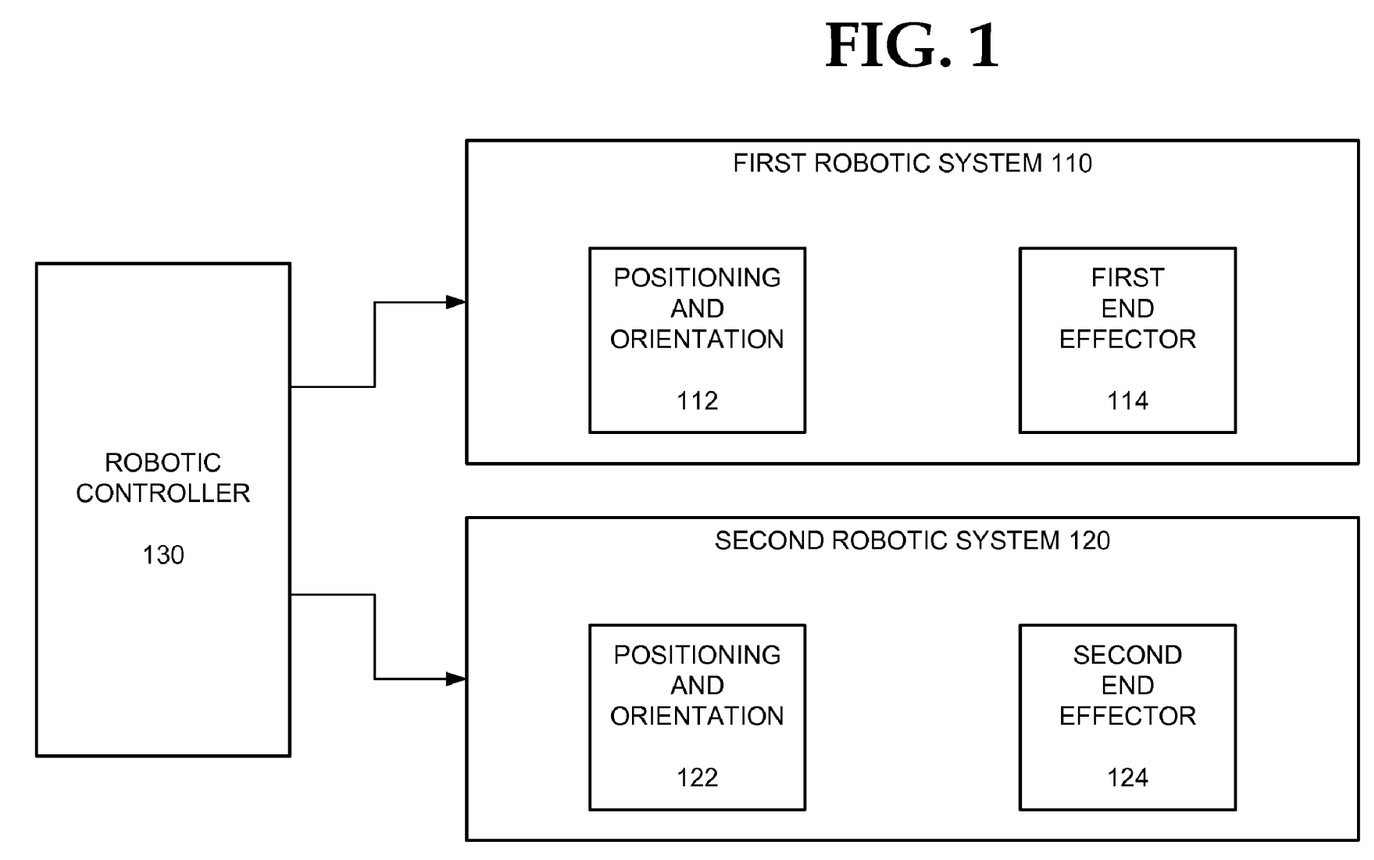
FIG. 1 is an illustration of a system including first and second robotic systems and a robotic controller.

Reference is made to FIG. 1, which illustrates first and second robotic systems 110 and 120 for performing one or more operations on a structure having a confined space. The first robotic system 110 includes a positioning and orientation system 112 for moving a first end effector 114 into the confined space and positioning and orienting the first end effector 114 within the confined space. The second robotic system 120 includes a positioning and orientation system 122 for moving a second end effector 124 outside the confined space. Once the first and second end effectors 114 and 124 are oriented and positioned, they perform one or more operations (e.g., assembly operations) on the structure.

A robotic controller 130 may include a computer that is programmed to operate the robotic systems 110 and 120. The computer includes computer memory that is encoded with data for commanding the first and second robotic system 110 and 120.

Figure 2:
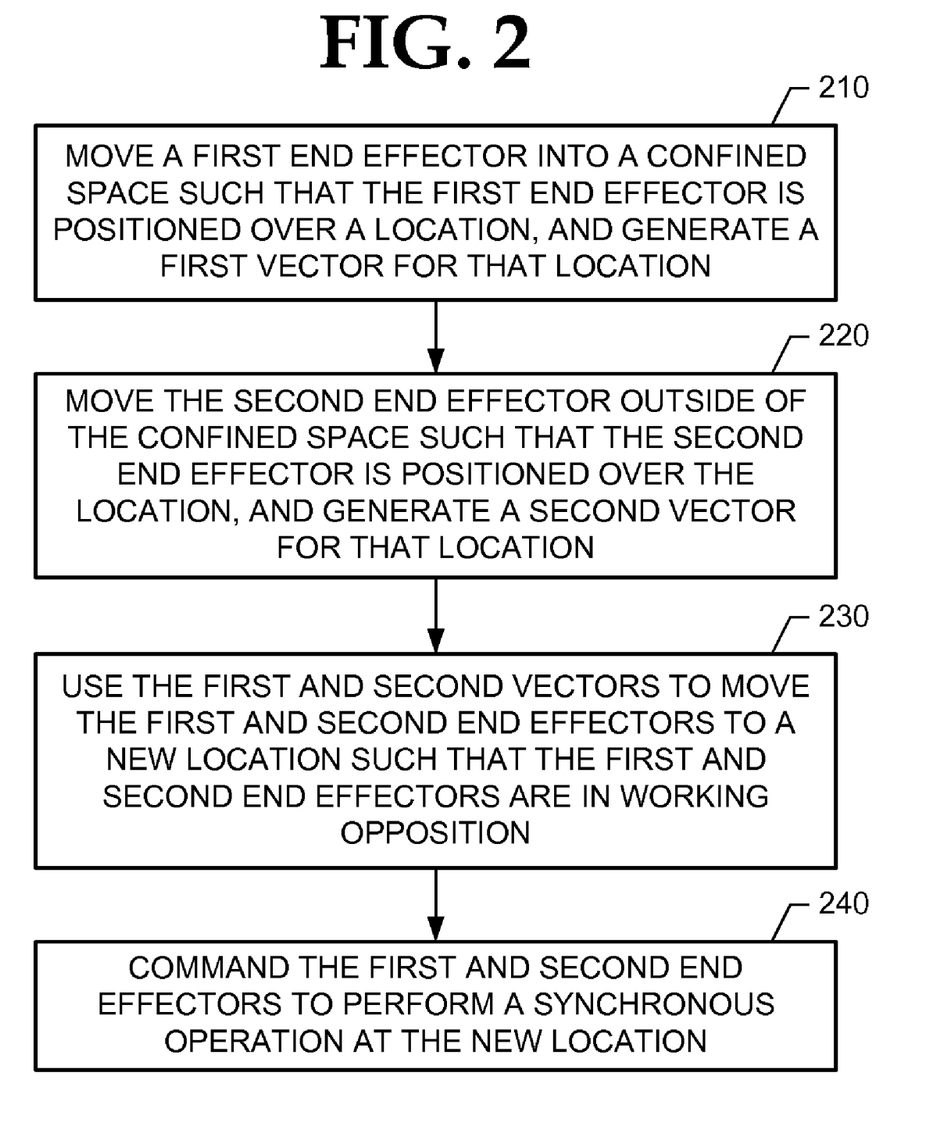
FIG. 2 is an illustration of a method of operating the robotic systems.

Reference is now made to FIG. 2, which illustrates a method of operating the first and second robotic systems 110 and 120 to perform a synchronous operation on a structure having a confined space. The structure has a location that is identifiable from within the confined space and also from outside the confined space. The location might be identified, without limitation, by visual means (e.g., a mark, a fastener, or a hole or other feature of the structure), magnetic means (e.g., by an embedded magnet), or by an instrumented fastener (described later).

At block 210, the first robotic system 110 is commanded to move the first end effector 114 into the confined space such that the first end effector 114 is positioned over the location. Once the first end effector 114 is positioned, the first robotic system 110 communicates a first vector to the robotic controller 130. The first vector may include position information (e.g., x-y coordinates) and/or angular orientation (e.g., with respect to the surface normal).

The precision of positioning the first end effector 114 is application-specific. For instance, the precision for aircraft assembly will typically be higher than other types of industrial assembly.

At block 220, the second robotic system 120 is commanded to move the second end effector 124 outside of the confined space such that the second end effector 124 is positioned over the location. Once the second end effector 124 is positioned, the second robotic system 120 communicates a second vector to the robotic controller 130. The second vector may include position information and/or angular orientation.

Thus, two vectors are communicated to the robotic controller 130. The first vector will be used as a frame of reference for the first robotic system 110. Similarly, the second vector will be used as a frame of reference for the second robotic system 120.

At block 230, the first and second robotic systems 110 and 120 use the first and second vectors, respectively, to move the first and second end effectors 114 and 124 to a new location. At this new location, the first and second end effectors 114 and 124 are in working opposition, with the first end effector 114 inside the confined space and the second end effector 124 outside the confined space.

At block 240, the first and second end effectors 114 and 124 are commanded to perform a synchronous operation at the new location. For example a synchronous assembly operation may be performed at the new location.

Thus, using the method of FIG. 2, a synchronous operation can be performed on the structure, even though the first end effector 114 isn't visible from outside the confined space. Moreover, the synchronous operation can be performed even though the robotic systems 110 and 120 do not have a single fixed frame of reference.

The method of FIG. 2 can be performed autonomously. Such autonomous operation can reduce or even eliminate manual assembly.

The method of FIG. 2 is not limited to obtaining a reference frame from a single location. If the structure contains multiple locations that are visible from inside and outside the confined space, two or more locations can be used to establish reference frames. An example of using two locations to establish reference frames is described below.

Figure 3A:
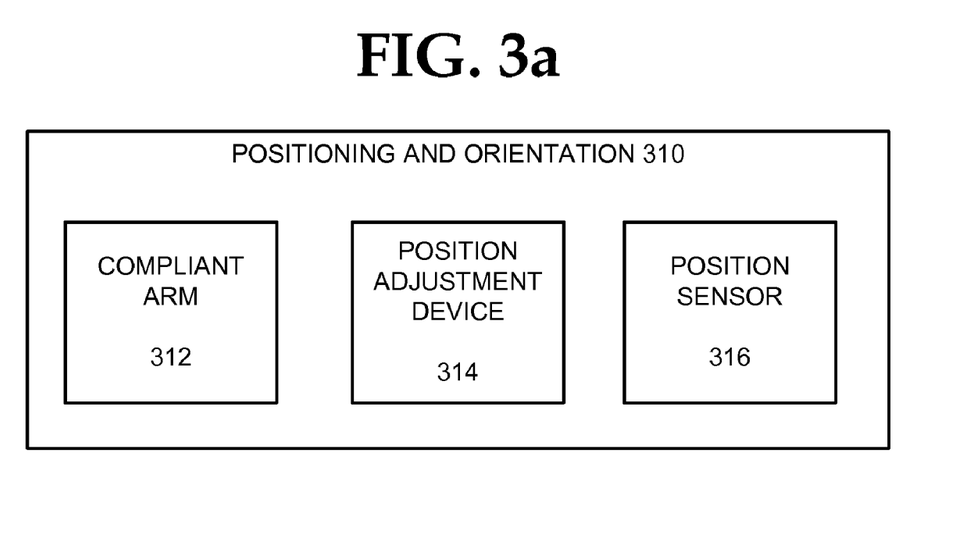
FIGS. 3a and 3b are illustrations of an apparatus and method for precise positioning within a confined space.
Figure 3B:
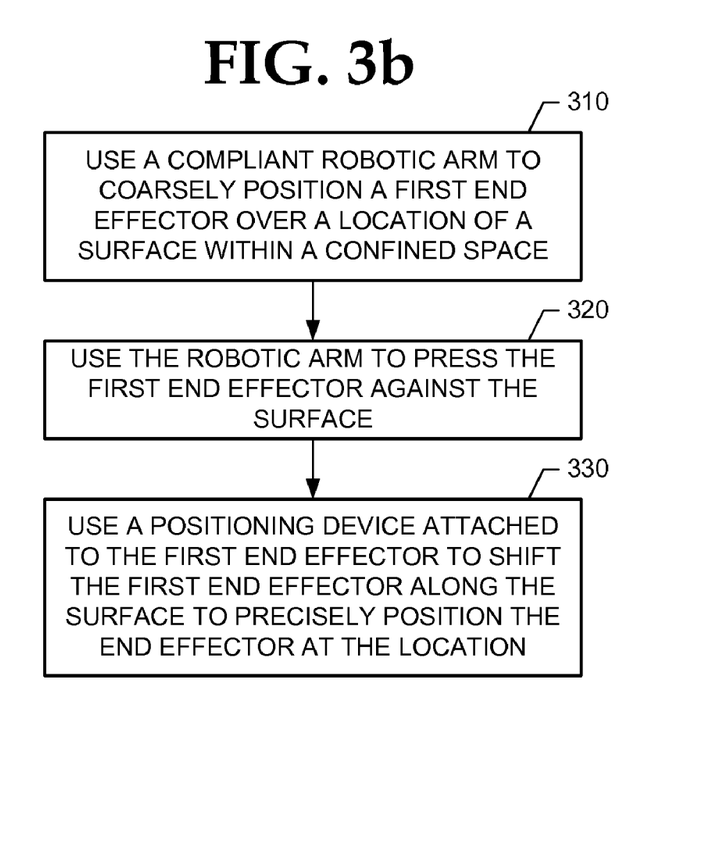

Reference is now made to FIGS. 3a and 3b, which illustrate an apparatus 310 and method of achieving precise positioning of the first end effector within the confined space. The apparatus 310 includes a long compliant arm 312 having multiple degrees of freedom. One example of such an arm is a snake arm. The first end effector is at a free end of the robotic arm 312. The apparatus 310 further includes a positioning device 314 attached to the first end effector.

At block 310, the compliant arm is used to coarsely position the first end effector over a location of a surface within the confined space. The position is coarse due to the compliance of the arm.

At block 320, the robotic arm 312 presses the first end effector against the surface. Friction between the first end effector and the surface will prevent the first end effector from shifting its x-y position due to compliance of the arm 312.

At block 330, the positioning device 314 is used to shift the position of the first end effector along the surface. A vision system 316 or other sensing device may be used to determine when the first end effector is positioned precisely at the location. The device 314 can be commanded to repeatedly shift the first end effector until the actual position of the first end effector is within a tolerance of the location. The positioning device 314 may be commanded by the robotic controller 130 or by a controller on-board first robotic system 110.

A synchronous operation and a structure are not limited to anything in particular. As but one example, a fastening operation may be performed on an aircraft structure having a confined space. Aircraft structures having at least one confined space include, but are not limited to, wings, horizontal and vertical stabilizers, and cargo compartments and other fuselage compartments.

Figure 4:
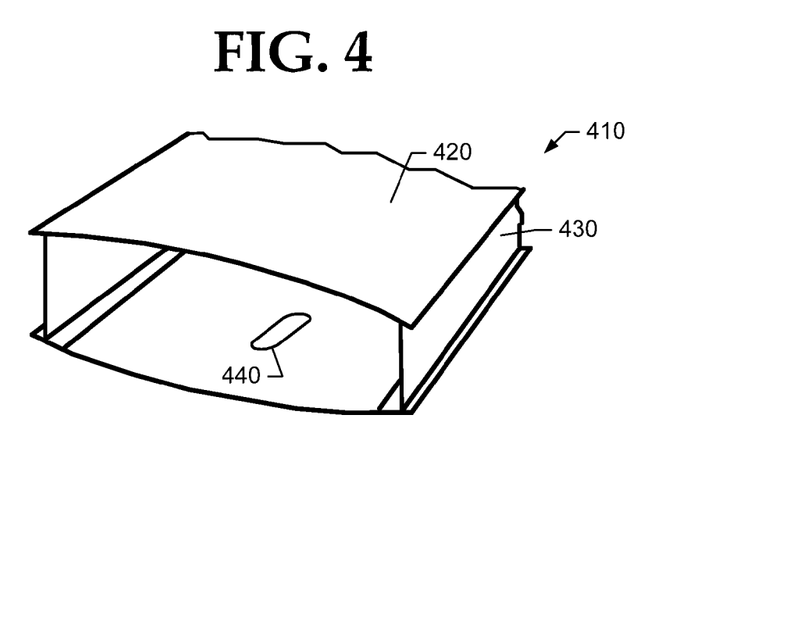
FIG. 4 is an illustration of a wing box of an aircraft.

Reference is now made to FIG. 4, which illustrates a wing bay 410 of a wing box. The wing box includes components such as skin panels 420, spars 430, and ribs (the ribs are not shown). Each wing bay 410 has a confined interior space and an access port 440 that leads to the confined space. The wing box has a plurality of wing bays 410.

The methods of FIGS. 2 and 3b may be adapted to perform permanent fastening operations on a pre-assembled wing box. During pre-assembly, faying (i.e., overlapping) surfaces of wing box parts (e.g., spars, skin panels, and ribs) are covered with sealant and pressed together. The sealant eliminates gaps between the faying surfaces to facilitate burrless drilling. The pressed-together parts of the wing box may then be fastened (temporarily or permanently) with tack fasteners. The tack fasteners may fasten spars to skin panels, spars to ribs, and ribs to skin panels.

In some embodiments, the wing box may be pre-assembled with instrumented fasteners disclosed in assignee's U.S. Ser. No. 11/756,447 filed May 31, 2007, which is incorporated herein by reference. In one embodiment, an instrumented fastener includes one or more light sources (e.g., light-emitting diodes) configured to produce light beacons. Information regarding the instrumented fastener (e.g., fastener number) may be encoded in the light beacons.

These instrumented fasteners allow the first robotic system to determine position and an orientation of an axis extending through a fastener location. The light beacons are directed inside and outside the wing bay, so they can be sensed by the robotic systems 110 and 120.

Figure 5A:
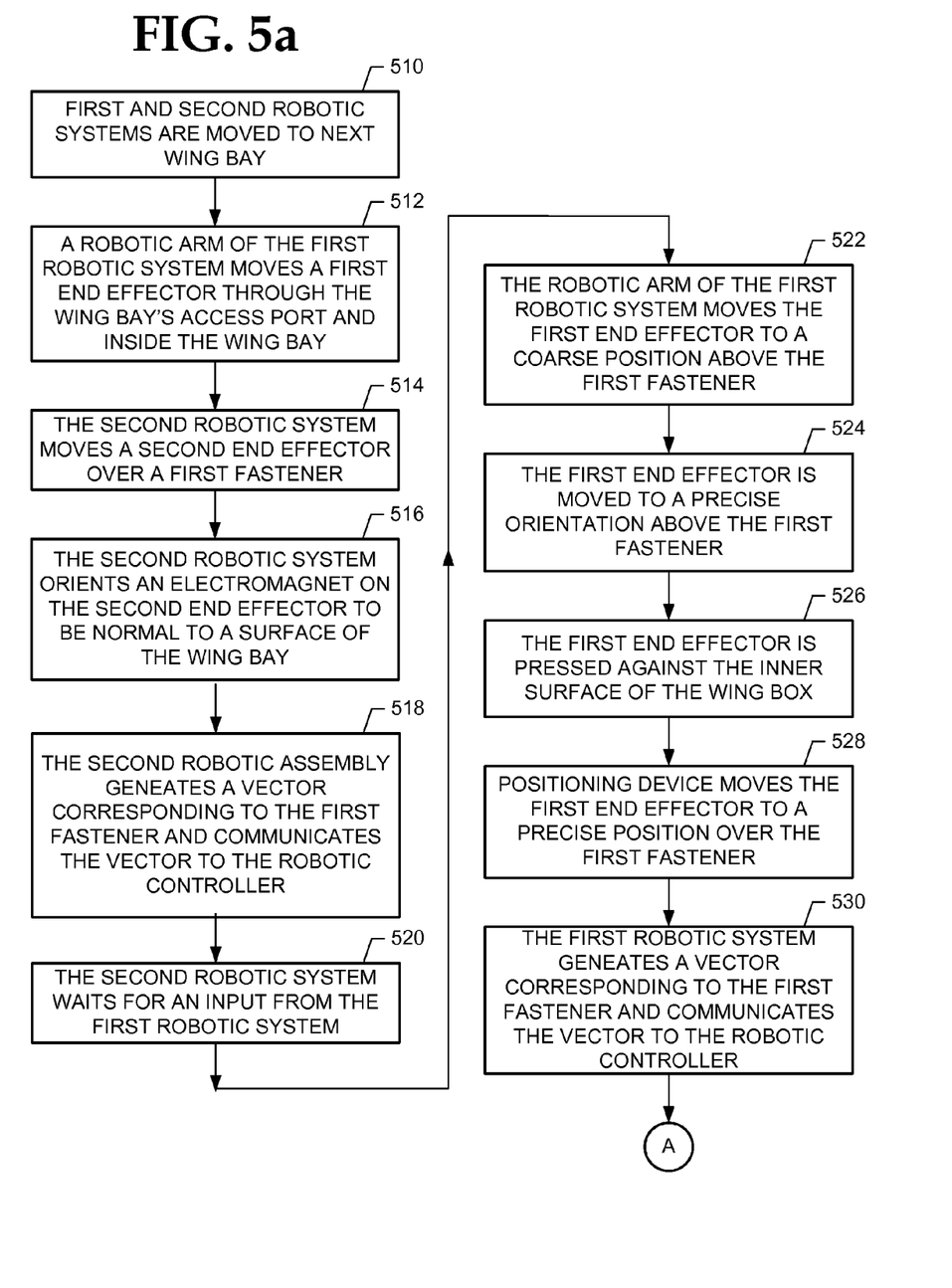
FIGS. 5a and 5b illustrate a method of operating the robotic systems.
Figure 5B:
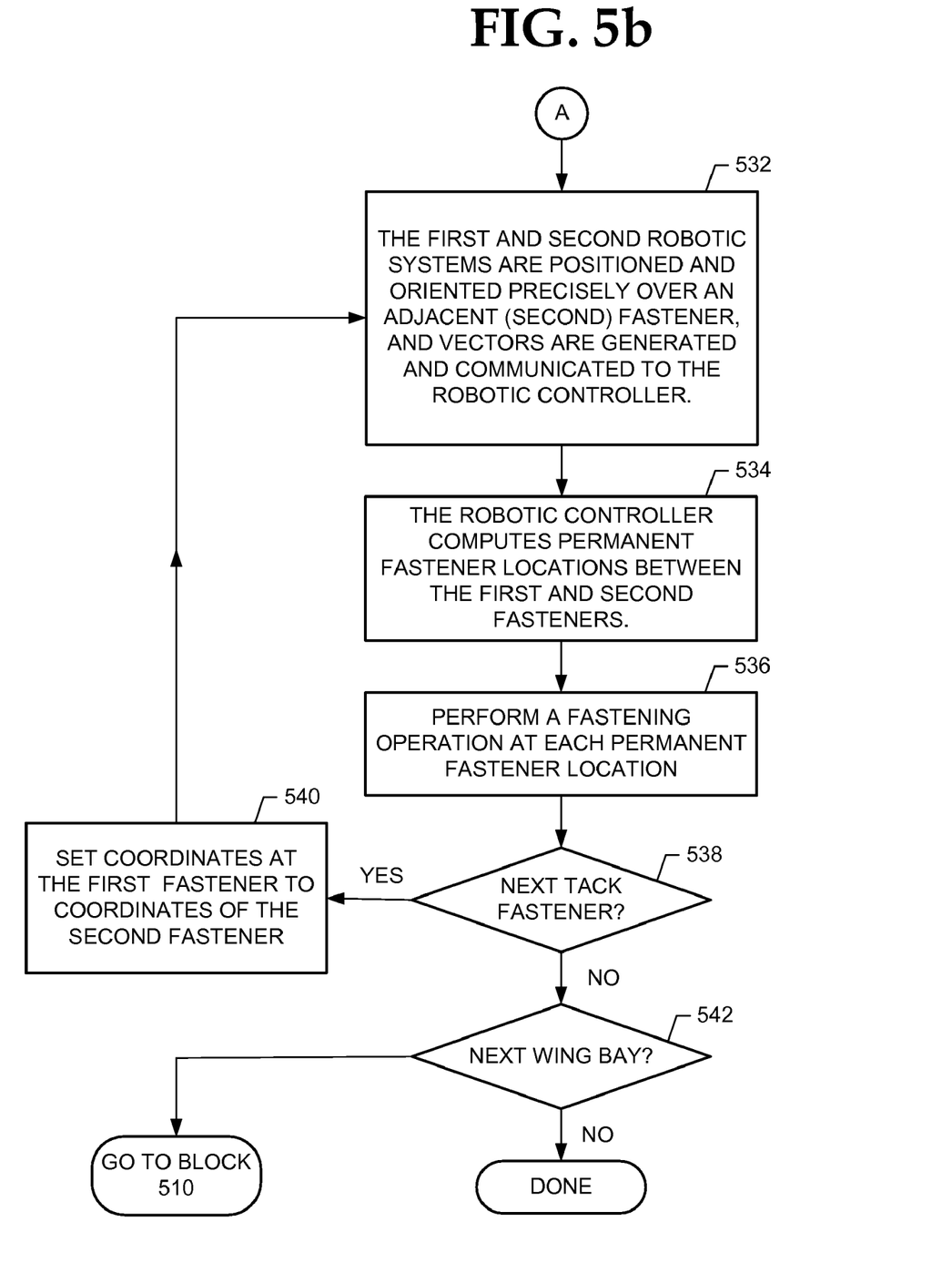

Additional reference is made to FIGS. 5a and 5b, which illustrate a method of performing permanent fastening operations on a pre-assembled wing box of an aircraft. The fastening operations will include drilling burrless holes through the wing box, inserting fasteners through the holes such that the fasteners extend into the wing box, and fastening nuts to the bolts from within the wing box.

At block 510, the first and second robotic systems are moved to a first wing bay. At block 512, a robotic arm of the first robotic system moves a first end effector through the wing bay's access port and inside the wing bay.

At block 514, the second robotic system moves a second end effector outside the wing box until the second end effector is over a first fastener. For example, the second robotic system can move the second end effector to a coarse position, determine $\Delta X$, $\Delta Y$ offsets (e.g., using a vision system), determine whether the offsets are within a tolerance, and, if not, adjust the position of second end effector until the offsets are within the tolerance. After the function at block 514 has been completed, the second end effector will have proper in-plane positioning with respect to the first fastener.

The pre-assembled wing box will typically have several tack fasteners for each wing bay. One of those fasteners will be identified as the "first." As a first example, the robotic controller could be programmed so the first end effector is moved to a specific location, presumably where the first fastener is roughly located. As a second example, a vision system is used to locate the first fastener. As a third example, the wing box is temporarily assembled with instrumented fasteners whose beacons are encoded with the fastener number. By decoding the beacons, it can be determined whether the end effector is positioned over the "number one" instrumented fastener.

At block 516, the second robotic system orients an electromagnet on the second end effector to be normal to a surface of the wing bay. For example, the second robotic system can move the second effector to a coarse rotational orientation, determine $\Delta A$, $\Delta B$ angular offsets from the surface normal, determine whether the offsets are within a tolerance, and, if not, adjust the rotational orientation of the second end effector until the offsets are within the tolerance.

Orientation relative to the surface normal could be sensed by a tactile or non-tactile sensor. For example, a sensor could have four detectors arranged in a circle (e.g., at 0°, 90°, 180° and 270°). Each detector measures intensity of the beacon. The second end effector is moved until all intensity measurements are the same, at which point the second end effector is centered over the first fastener and normal to the surface of the wing bay.

At block 518, the second robotic assembly generates the location and orientation $[X1, Y1, A1, B1]_2$ of the second end effector with respect to the first fastener, and communicates this vector to the robotic controller. At block 520, the second robotic system then waits for an input from the first robotic system.

At block 522, the robotic arm of the first robotic system moves the first end effector to a coarse position above the first tack fastener. For example, the first robotic system can move the first effector to a coarse position, determine $\Delta X$, $\Delta Y$ offsets (e.g., using a vision system) to the first fastener; determine whether the offsets are within a coarse position tolerance, and, if not, adjust the position of first end effector until the offsets are within the coarse position tolerance.

At block 524, the first end effector is moved to a precise orientation above the first tack fastener. For example, the first end effector is moved to a rotational orientation. Internal sensors or read encoders are used to determine $\Delta A$, $\Delta B$, and $\Delta C$ orientation offsets. The orientation offsets are compared to a tolerance, and the orientation is further adjusted until the orientation offsets are within the tolerance.

At block 526, the first robotic system presses the first end effector against the inner surface of the wing box. Friction between the surfaces will prevent the first end effector from shifting position (due to the compliance of the robotic arm).

At block 528, the positioning device attached to the first end effector moves the first end effector to a precise position over the first tack fastener. For example, the first robotic system can determine $\Delta X$, $\Delta Y$ offsets (e.g., using a vision system) to the first tack fastener; determine whether the offsets are within a fine position tolerance, and, if not, commands the device to shift the position of first end effector until the offsets are within the fine position tolerance.

At block 530, the first robotic system generates the location and orientation [X1, Y1, A1, B1, C1] 1 of the first end effector with respect to the first tack fastener. This vector is communicated to the robotic controller At block 532, the first and second robotic systems are positioned and oriented precisely over an adjacent (second) fastener, and the vectors $[X2, Y2, A2, B2, C2]_1$ and $[X2, Y2, A2, B2]_2$ at the second tack fastener are generated and communicated to the robotic controller. The functions at blocks 514-530 may be repeated here, except that they are performed for the second fastener.

Figure 6:
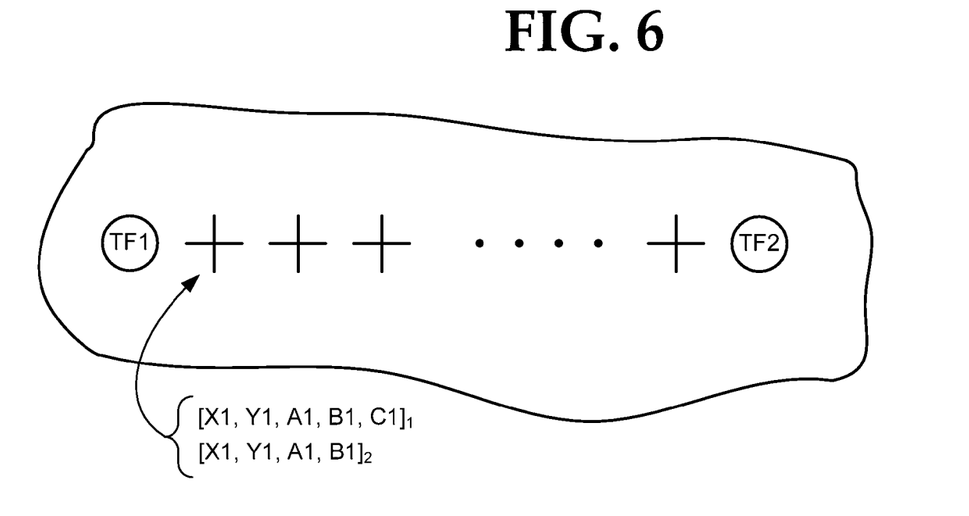
FIG. 6 is an illustration of permanent fastener locations relative to two pre-assembly fasteners.

At block 534, the robotic controller computes permanent fastener locations between the first and second fasteners. FIG. 6 illustrates permanent fastener locations (represented by crosses) that are in-line and equally spaced apart between the first and second fasteners TF1 and TF2. However, the permanent fastener locations are not so limited. For example, the permanent fastener locations could follow a curve between the first and second fasteners TF1 and TF2.

Figure 7:
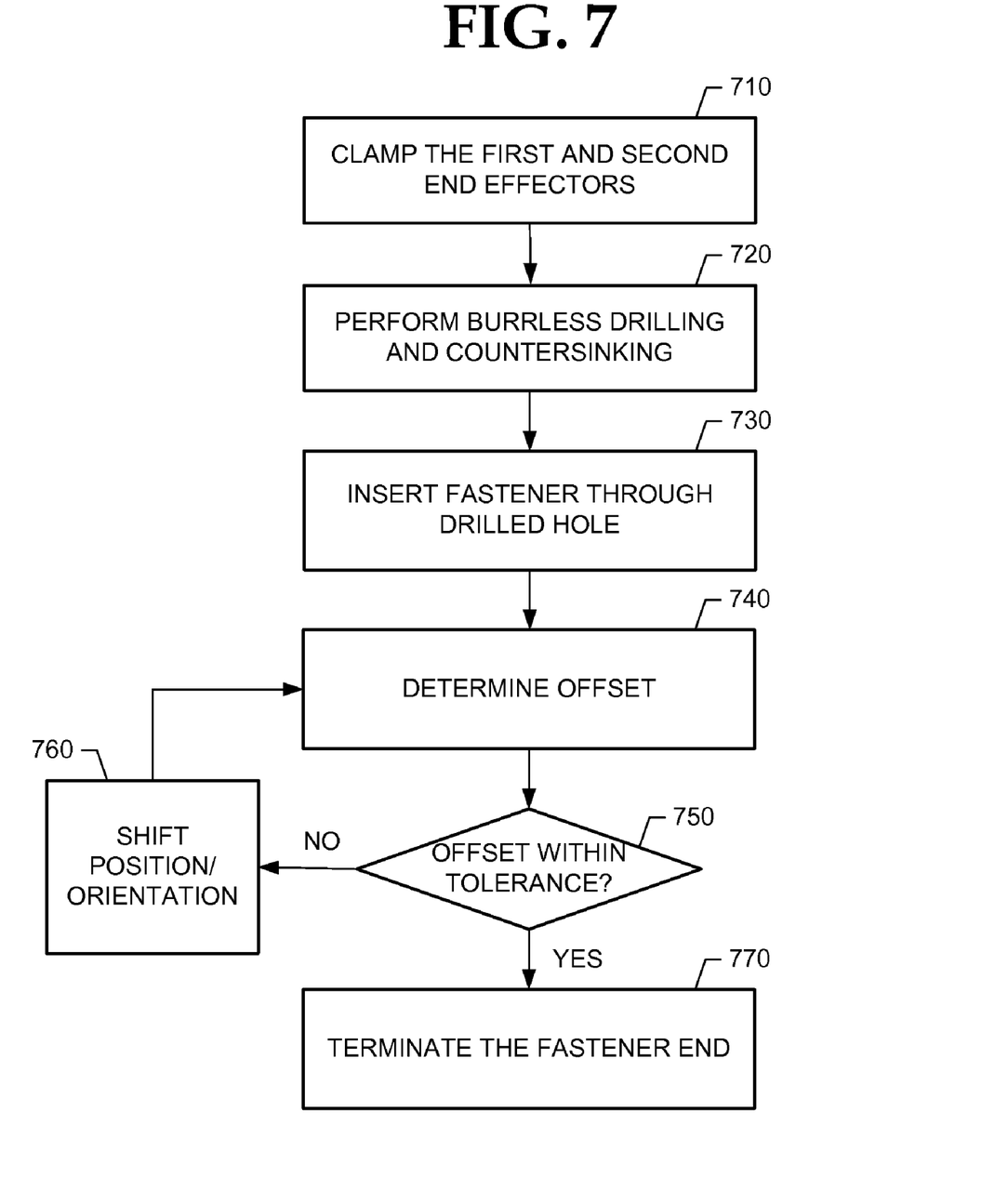
FIG. 7 is an illustration of a method of performing a fastening operation.

At block 536, a fastening operation is performed at each permanent fastener location. An example of a fastening operation is illustrated in FIG. 7. However, the method of FIG. 5 is not limited to such a fastening operation. Other fastening operations include, without limitation, riveting.

At blocks 538-540, after the last permanent fastening operation has been performed, the coordinates at the first fastener are set to the coordinates of the second fastener. That is, $[X1, Y1, A1, B1, C1]_1 = [X2, Y2, A2, B2, C2]_1$ and
$[X1, Y1, A1, B1] = [X2, Y2, A2, B2]_2$.

Control is then returned to block 532.

After the last permanent fastening operation in the wing bay is performed, control is returned to block 510, whereby the first and second robotic assemblies are moved to, and perform permanent fastening operations on, the next wing bay. The method continues (block 542) until fastening operations have been performed on each wing bay of the wing box.

Reference is now made to FIG. 7, which illustrates an example of a fastening operation that is performed by the first and second robotic systems. The fastening operation includes clamping the first and second end effectors against their respective surfaces (block 710). This may be done, for example, by activating an electromagnet on the second end effector to magnetically attract a steel plate on the first end effector (magnetic flux from the electromagnet penetrates the parts being clamped together).

This clamping force squeezes out sealant and substantially eliminates the gap between faying surfaces of parts. This facilitates burrless drilling, which the second end effector performs at block 720. The second end effector may also perform countersinking at block 720. At block 730, the second end effector inserts a fastener through the drilled hole.

At block 740, the position of the first end effector relative to the inserted bolt is determined. If the offset is not within tolerances (block 750), the positioning device at the end of the first end effector is used to shift the position and/or change the orientation of the first end effector (block 760). The magnetic clamping force between the first and second end effectors may be relaxed to allow the position adjustment.

At block 770, the first end effector terminates the end of the fastener. For example, the first end effector installs a sleeve and nut onto the fastener.

Figure 8:
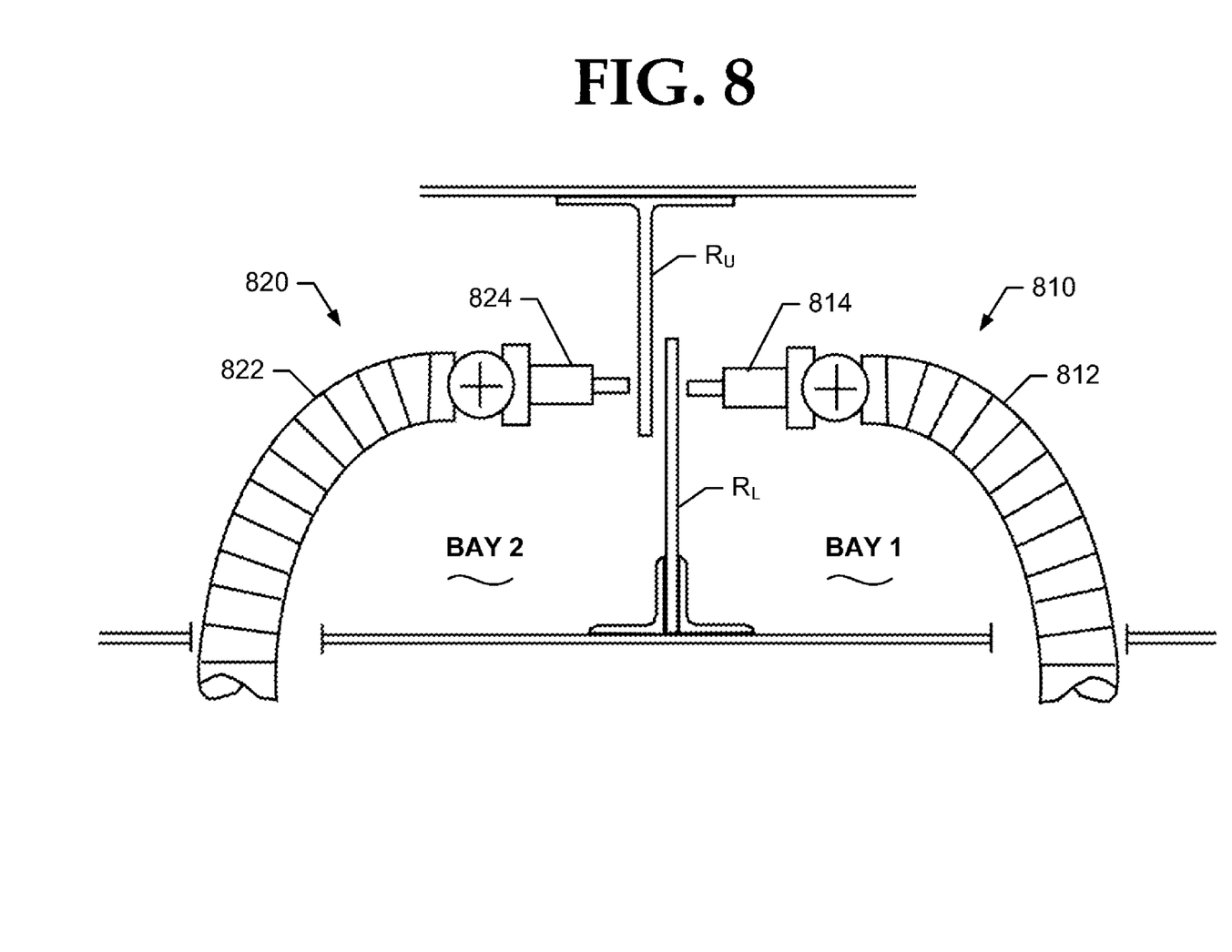
FIG. 8 is an illustration of two robotic arms in adjacent confined spaces.

Reference is made to FIG. 8. In other embodiments, the second robotic system 820 may have the same configuration as, and perform the same functions as the first robotic system 810. For example, the first and second robotic systems 810 and 820 may include compliant arms 812 and 822 for moving first and second end effectors 814 and 824 in adjacent bays and perform fastening operations on upper and lower halves $R_U$ and $R_L$ of a rib or other structure. Of course, these other embodiments are not limited to wing boxes, and may be applied to synchronous operations performed across other adjacent confined spaces.

A system herein is not limited to a robotic arm for positioning an end effector in a confined space. For example, a crawler could be used instead of a robotic arm to position an end effector in a confined space.

A method herein is not limited to a fastening operation. A method herein could be used to perform other operations on an aircraft. Examples of such operations include, without limitation, sealant application, cleaning, painting and inspection within a confined space.

A method herein is not limited to synchronous operations on an aircraft. For example, a method herein could be applied to synchronous operations on containers, autos, trucks, ships, and other structures having confined spaces.

With respect to aircraft, a method herein is not limited to manufacture. A method herein could be applied to other stages of aircraft manufacture and service.

Figure 9:
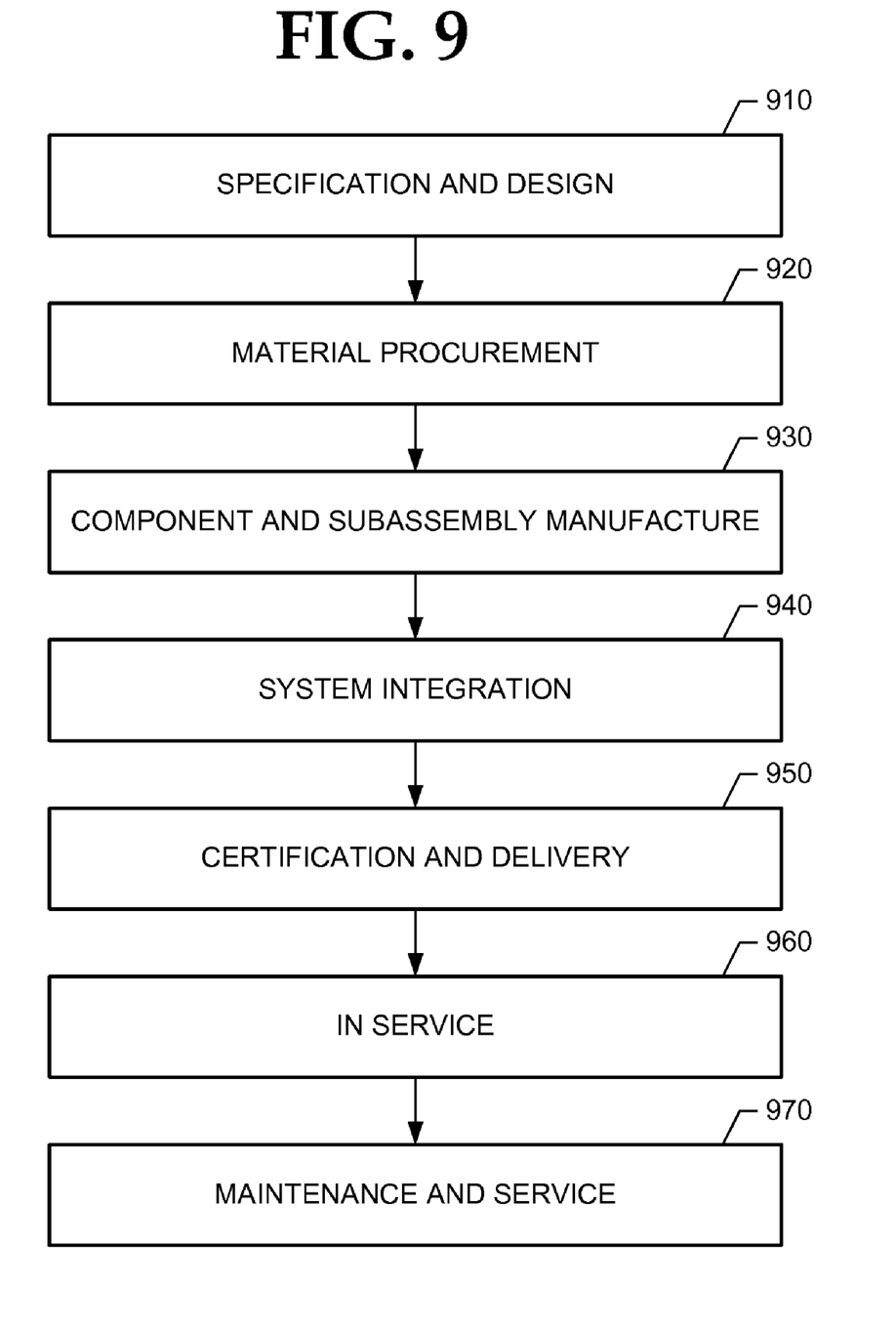
FIG. 9 is a flow diagram of aircraft production and service methodology.

Reference is now made to FIG. 9, which illustrates an example of an aircraft manufacturing and service method. During pre-production, the method may include specification and design 910 of an aircraft and material procurement 920. During production, component and subassembly manufacturing 930 and system integration 940 of the aircraft takes place. Thereafter, the aircraft may go through certification and delivery 950 in order to be placed in service 960. While in service by a customer, the aircraft is scheduled for routine maintenance and service 970 (which may also include modification, reconfiguration, refurbishment, and so on).

Each of the processes of the method may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Embodiments herein may be employed during any one or more of the stages of the production and service method. For example, components or subassemblies corresponding to production process 930 may be fabricated or manufactured in a manner similar to components or subassemblies produced while the aircraft is in service. Also, one or more apparatus embodiments, method embodiments, or a combination thereof may be utilized during the production stages 930 and 940, for example, by substantially expediting assembly of or reducing the cost of an aircraft. Similarly, one or more embodiments herein may be utilized while the aircraft is in service, for example and without limitation, to maintenance and service 970.

The invention claimed is:

1. A fully automated method of performing an operation on a structure having a confined space, the structure having a location that is identifiable from within the confined space and from outside the confined space, the method comprising:
   using a first robotic system to move a first end effector inside the confined space such that the first end effector is positioned over the location, and generating a first vector corresponding to the location;
   using a second robotic system to move a second end effector outside the confined space such that the second end effector is positioned over the location, and generating a second vector corresponding to the location;
   using the first and second vectors to move the first and second end effectors to a new location such that the first and second end effectors are in working opposition; and
   using the first and second end effectors to perform the operation at the new location.

2. The method of claim 1, wherein each robotic system communicates its vector to a robotic controller when a precise position has been achieved.

3. The method of claim 1, wherein the operation includes synchronous assembly.

4. The method of claim 3, the synchronous assembly includes the second robotic system drilling a hole at the new location and inserting a fastener through the hole, and the first robotic system terminating the fastener.

5. The method of claim 4, further comprising creating a magnetic attraction between the first and second end effectors so that burrless drilling of the hole is performed.

6. The method of claim 1, further comprising using the first and second robotic system to position the first and second end effectors at a second location and generate first and second vectors corresponding to the second location, wherein the new location for the first end effector is computed with respect to the first vectors, and wherein the new location for the second end effector is computed with from the second vectors.

7. The method of claim 6, further comprising computing a plurality of permanent fastener locations between the first and second locations.

8. The method of claim 1, wherein a compliant arm of the first robotic system is used to coarsely position the first end effector over the location and press the first end effector against the surface, and wherein a device attached to the first end effector is used to shift the first end effector along the surface.

9. The method of claim 1, wherein an instrumented fastener is at the location, and wherein the vectors are obtained from beacons generated by the instrumented fastener.

10. The method of claim 1, wherein the structure is an aircraft wing box.

11. The method of claim 10, wherein the second robotic system moves the second end effector through an access port and into a confined space of an adjacent wing box.

12. An article comprising computer memory encoded with data for commanding the first and second robotic systems to perform the method of claim 1.

13. A system comprising the first and second robotic systems; and a robotic controller for causing the first and second robotic systems to perform the method of claim 1.

14. A method for positioning an end effector within a confined space of a structure, the method comprising:
   using a compliant robotic arm to move the end effector through an access port of the structure and into the confined space;
   using the robotic arm to coarsely position the end effector over a location of a surface in the confined space;
   using the robotic arm to press the end effector against the surface; and
   using a device attached to the end effector to shift the end effector along the surface to precisely position the end effector at the location.

15. A method performed on a pre-assembled wing box of an aircraft, the wing box pre-assembled with a plurality of fasteners, the method comprising
   using a first robotic system to move a first end effector inside the wing box over first and second fasteners, and generating first vectors for the first and second fasteners;
   using a second robotic system to move a second end effector outside the wing box over the first and second fasteners and generating second vectors for the first and second fasteners; and
   using the first and second vectors to compute permanent fastener locations between the first and second fasteners, the permanent fastener locations for the first robotic system computed from the first vectors, the permanent fastener locations for the second robotic system computed from the second vectors.

16. The method of claim 15, further comprising using the first robotic system to move the first end effector to a permanent fastener location inside the wing box, using the second robotic system to move the second end effector to the corresponding permanent fastener location outside the wing box; and using the end effectors to perform a synchronous assembly operation at their respective locations.

17. The method of claim 15, further comprising pre-assembling the wing box prior to using the first and second robotic systems.

18. The method of claim 17, wherein the wing box is pre-assembled with instrumented fasteners; and wherein the first and second vectors are generated by sensing the orientation of beacons emanating from the first and second fasteners.

19. An article comprising computer memory encoded with data for causing the first and second robotic systems to perform the method of claim 15.

20. A system comprising the first and second robotic systems; and a robotic controller for causing the first and second robotic systems to perform the method of claim 15.

* * * * *